(12) United States Patent
Colloff

(10) Patent No.: US 8,411,677 B1
(45) Date of Patent: Apr. 2, 2013

(54) METHOD AND SYSTEM FOR PROCESSING LAYERED NETWORKING PROTOCOL PACKETS

(75) Inventor: Ian G. Colloff, Los Gatos, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 1139 days.

(21) Appl. No.: 11/842,830

(22) Filed: Aug. 21, 2007

(51) Int. Cl.
*H04L 12/28* (2006.01)
*H04J 3/02* (2006.01)
*G06F 15/167* (2006.01)
*G06F 15/16* (2006.01)

(52) U.S. Cl. ............... 370/389; 370/392; 370/395.52; 370/462; 709/213; 709/219

(58) Field of Classification Search ............... None
See application file for complete search history.

(56) References Cited

U.S. PATENT DOCUMENTS

| | | | |
|---|---|---|---|
| 2003/0200284 A1* | 10/2003 | Philbrick et al. | 709/219 |
| 2007/0008988 A1* | 1/2007 | Kim et al. | 370/462 |
| 2007/0147390 A1* | 6/2007 | Jung et al. | 370/395.52 |
| 2008/0080514 A1* | 4/2008 | Louzoun et al. | 370/394 |
| 2008/0155051 A1* | 6/2008 | Moshayedi | 709/213 |

* cited by examiner

*Primary Examiner* — Brandon Renner
(74) *Attorney, Agent, or Firm* — Klein, O'Neill & Singh, LLP

(57) ABSTRACT

An adapter for decoding information packet of a layered information transfer protocol received over a link is disclosed. The information packet is arranged in one or more predetermined layered protocol format and includes a payload data. The adapter includes a receive filter bank configured to process a portion of the information packet and assemble the payload data in a predetermined interconnect format. An adapter for encoding a payload data and destination information for the payload data received over an interconnect is also disclosed. The payload data is arranged in one or more predetermined interconnect format. The adapter includes a send filter bank configured to process a portion of the payload data and assemble the payload data with the destination information in a predetermined layered protocol format.

22 Claims, 8 Drawing Sheets

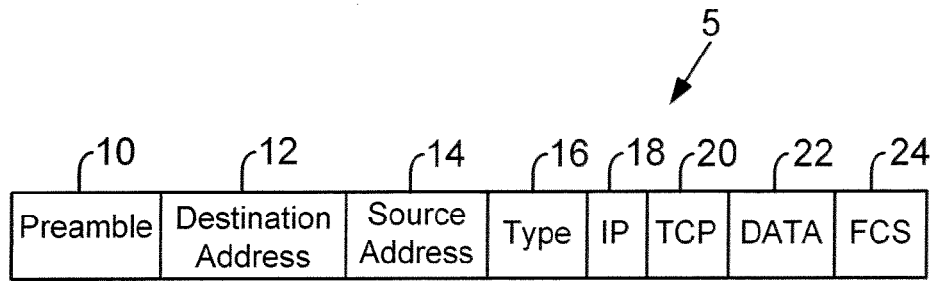
FIG. 1A
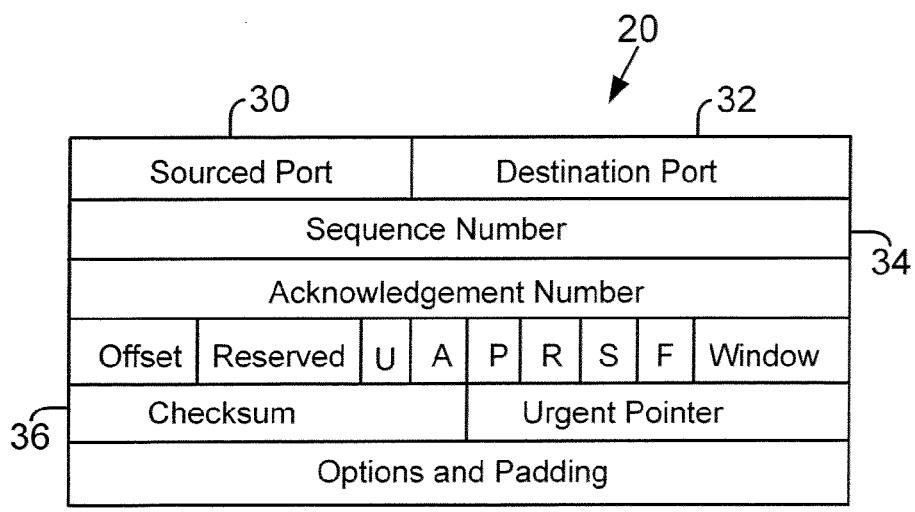
FIG. 1B
| Destination Port | Application |
|---|---|
| 21 | FTP |
| 23 | Telnet |
| 25 | SMTP |
| 80 | http |
| 3260 | iSCSI |
FIG. 1C

METHOD AND SYSTEM FOR PROCESSING LAYERED NETWORKING PROTOCOL PACKETS

TECHNICAL FIELD

The present disclosure relates to network systems, and more particularly to, methods and systems for processing network information using layered protocols.

RELATED ART

In a network, endpoint host systems (including computing systems or networked devices) often exchange information by transporting data signals over an interconnecting network, using a layered networking protocol. Each host system is typically coupled to the network by a network interface unit (NIU), which connects to the physical medium of the network and allows the host system to communicate data signals in a prevailing network format. Each host system also includes a host processor which performs data processing, storage, and input/output services, and which communicates network information (or data blocks) with the corresponding NIU.

To send information, typically, a host processor (may also be referred to as a central processing unit (CPU)) assembles an outbound ordered data block, for example, by pre-pending, post-pending, or interposing, one or more defined protocol fields to each outbound data block. After assembly, the host processor conveys the outgoing ordered data block to the NIU. The NIU may transform the ordered data blocks into data signals in a prevailing network format, and transmit the outbound data via the network medium. Similarly, inbound data from the network medium are received by the NIU, transformed into an ordered data block, and conveyed to the host processor. In turn, the host processor extracts inbound data using the layered network protocol corresponding to the received data block, and by disassembling the ordered data block into incoming data accordingly. An incoming ordered data block may be disassembled by removing defined protocol fields, which were pre-pended, post-pended, or interposed during outbound assembly. Traditionally, layered protocol processing is performed primarily in software, thereby burdening the host processor. Because the content, location, and order of the respective protocol fields can vary from block to block, even within a single protocol layer, substantial host system resources may be consumed by layered protocol assembly, disassembly, or both.

Networks processing speeds continue to increase. There is also a desire to move towards a unified fabric (or Channel), where target protocols are being encapsulated onto a unified fabric, for example, SCSI over TCP/IP (iSCSI); FC over TCP/IP; IP over InfiniBand(IB) (IPoIB); SCSI over RDMA:—SRP(SCSI over IB); iSER (iSCSI over iWARP), etc, etc.

Until recently, standard microprocessors have been capable of handling routine layered protocol traffic in a timely fashion. However, increasing demand for networked resources has driven the emergence of high performance networking infrastructures, as exemplified by the Gigabit Ethernet (GbE) and InfiniBand (IB) network infrastructures. High-performance storage protocols have evolved, in tandem with high performance networking protocols, to allow massive amounts of data, including video and audio data, to be transported over a high performance network infrastructure. Such storage protocol implementations may impose additional burden upon a CPU, for example, performing cyclic redundancy code (CRC) calculations using software executed by a host CPU may add significant additional compute cycles.

Despite the development of high-bandwidth NIUs, faster processors, and networking techniques, such as network segmentation, many current host processors may be hard-pressed to process network, storage and data traffic simultaneously. Indeed, there are some concerns that current host processors may be unable to process data blocks using a high-performance network or storage protocols at a full 10 Gigabit-per-second (Gbps) line rate, or beyond. For example, the process for extracting a payload data portion from a TCP/IP protocol packet may use significant compute cycles because in addition to decoding various fields of a TCP/IP protocol packet, the DATA field of the TCP/IP protocol is also decoded before data from the DATA field is retrieved. Hence, as transmission speeds for networks are increasing, there is a need to efficiently decode the TCP/IP packet and extract the payload data portion.

In general, many current and proposed solutions for managing network traffic turn to increasing the number of host processors, increasing the number of data channels processed by a host system, increasing the number of NIUs, adding co-processors to work in parallel with a host processor, or some combination thereof. One co-processing solution is host processor off-loading, in which at least some of protocol processing functionality may be transferred from the host processor to a coprocessor unit, an offload engine. The co-processing solution may not be desirable because additional overhead may be imposed to coordinate out-of-band processing by the offload engine with a host processor, where the coordination efforts typically borne by the host processor. Also, an offload engine co-processor may increase overall host computer complexity, cost, and power consumption, perhaps unacceptably. Moreover, although an offload engine may relieve present processing performance shortfalls, sustaining acceptable performance may be difficult beyond 10 Gbps transmission rates.

Therefore, there is a need for a system and method for efficiently managing network information.

SUMMARY

In one embodiment, an adapter for decoding information packet of a layered information transfer protocol received over a link wherein the information packet is arranged in one or more predetermined layered protocol format and includes a payload data is disclosed. The adapter includes a receive filter bank that is configured to process a portion of the information packet and assemble the payload data in a predetermined interconnect format.

In another embodiment, an adapter for encoding a payload data and destination information for the payload data received over an interconnect is disclosed. The payload data is arranged in one or more predetermined interconnect format. The adapter includes a send filter bank that is configured to process a portion of the payload data and assemble the payload data with the destination information in a predetermined layered protocol format.

In yet another embodiment, a method of decoding information packet of a layered information transfer protocol received over a link is disclosed. The information packet is arranged in one or more predetermined layered protocol format and includes a payload data. The method includes processing a portion of the information packet through a receive filter bank and assembling the payload data in a predetermined interconnect format.

In yet another embodiment, a method for encoding a payload data and destination information for the payload data received over an interconnect is disclosed. The payload data is arranged in one or more predetermined interconnect format. The method includes processing a portion of the payload data through a send filter bank and assembling the payload data with the destination information in a predetermined layered protocol format.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIGS. 1A-1D shows examples of TCP IP protocol based packet fields for use in a networked system with a network interface unit of one embodiment:

DETAILED DESCRIPTION

Figure 1D:
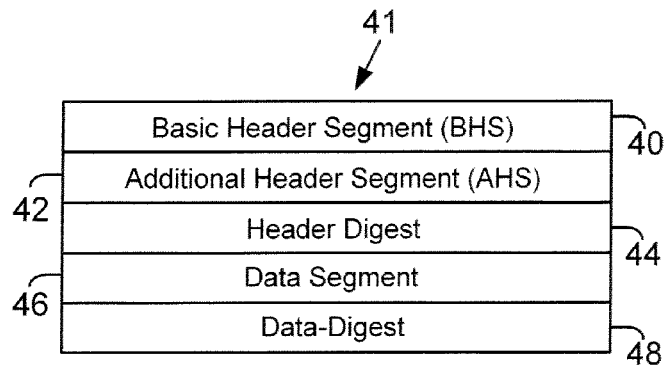

In one embodiment, a system and method for decoding an information packet received over a network by a host system is provided. The information packet is arranged in one or more predetermined layered network protocol format and may include a payload data. The information packet is processed by a receive filter bank that is configured to process a portion of the information packet and assembles the payload data in a predetermined interconnect format. The receive filter bank includes one or more receive filter logic, which receive select portion of the information packet, and manipulates the select portions of the information packet.

In another embodiment of the present invention, a system and method for encoding payload data arranged in a predetermined interconnect format received over an interconnect from a host system is provided. The payload is encoded to form an information packet that is arranged in a predetermined layered network protocol and sent to a network device/host system (used interchangeably throughout this specification). A send filter bank that assembles the information packet in a predetermined layered network protocol processes the payload data and destination information. The send filter bank includes one or more send filter logic, which receive select portion of the payload data, and manipulates the select portions of the payload data.

To facilitate an understanding of the various embodiments, the general architecture and operation of a system will be described. The specific architecture and operation of the various embodiments will then be described with reference to the general architecture.

Host systems (or host computing systems) often communicate with storage systems via a host bus adapter ("HBA", may also be referred to as a "controller" and/or "adapter") using an interface, for example, a "PCI" bus interface. PCI stands for Peripheral Component Interconnect, a local bus standard, and the PCI standard is incorporated herein by reference in its entirety. PCI-X is another standard bus that is compatible with existing PCI cards using the PCI bus. The PCI-X standard is also incorporated herein by reference in its entirety. PCI-Express is yet another interconnect standard that is used to couple a HBA to a host system and is incorporated herein by reference in its entirety.

Various other standard interfaces may be used to move data from host systems to storage devices. Internet SCSI (iSCSI) is one such standard as defined by the Internet Engineering Task Force (IETF). iSCSI maps the standard SCSI protocol on top of the TCP/IP protocol. iSCSI (incorporated herein by reference in its entirety) is based on Small Computer Systems Interface ("SCSI"), which enables host computer systems to perform block data input/output ("I/O") operations with a variety of peripheral devices including disk and tape devices, optical storage devices, as well as printers and scanners.

A traditional SCSI connection between a host system and peripheral device is through parallel cabling and is limited by distance and device support constraints. For storage applications, iSCSI was developed to take advantage of network architectures based on Fibre Channel and Gigabit Ethernet standards. iSCSI leverages the SCSI protocol over established networked infrastructures and defines the means for enabling block storage applications over TCP (Transmission Control Protocol)/IP (Internet Protocol) networks. iSCSI defines mapping of the SCSI protocol with TCP/IP.

Networks are generally defined as having layers of protocol. The iSCSI and TCP/IP protocol suite consist of 4 protocol layers; the application layer (of which iSCSI is one application), the transport layer (TCP), the network layer (IP) and the link layer (i.e. Ethernet). A complete description of the TCP/IP protocol suite is provided in "TCP/IP" Illustrated, Vol. 1 by W. Richard Stevens and Volume 2 by Gary R. Wright and W. Richard Stevens published by Addison Wesley Professional Computing Series.

The following provide a brief overview of TCP, iSCSI and RDMA protocol/standards.

TCP (Transmission Control Protocol): TCP is a network protocol that provides connection-oriented, reliable, byte stream service. This means that two nodes establish a logical connection before sending data and that TCP maintains state information regarding the data transfer. A byte stream service means that TCP views data to be sent as a continuous data stream that is sent in any way it sees fit and delivers it to the remote node as a byte stream.

Typical TCP/IP Packet: In a typical layered network protocol, there are various layers of protocol, as previously explained. A given layered protocol packet will have predefined fields and each field will contain information relevant to one or more protocol layers. For example, referring to a TCP/IP protocol packet 5 shown in FIG. 1A, there are eight defined fields namely: Preamble 10, Destination address 12.

Source address 14, Type 16, IP 18, TCP Header 20, Data segment (or Data) 22 and frame check sequence (FCS) 24.

FIG. 1B shows a TCP header 20. TCP header 20 includes various fields including Source Port identifier 30, Destination Port identifier 32. Sequence Number 34 and a checksum value 36. The Destination Port 32 in a TCP Header indicates the destination port for the Data 22 field. FIG. 1C shows examples of some well-known TCP Destination Ports are 21 (FTP), 23 (Telnet), 25 (SMTP), 80 (http) and 3260 (iSCSI). For example, the Destination Port 3260 in TCP Header 20 field indicates that Data 22 field of is for an iSCSI application.

Sequence Numbering in TCP Data Transfer: Referring back to FIG. 1B, (each) byte of data sent using a TCP connection is tagged with a sequence number 34. Each TCP header 20 contains the sequence number of the first byte of data in the data segment 22. This sequence number is incremented for each byte of data sent so that when the next segment is to be sent, the sequence number is again set for the first byte of data for that segment. The sequence numbering is used to determine when data is lost during delivery and needs to be retransmitted.

When the TCP header 20 Destination Port 32 is 3260 (iSCSI), the Data segment 22 field in the TCP/IP packet 5 includes an iSCSI Protocol Data Unit (PDU). FIG. 1D shows an iSCSI PDU 41 includes various fields, for example, Basic Header Segment (BHS) 40, Additional Header Segment (AHS) 42, Header Digest 44, Data Segment 46 and Data Digest 48.

iSCSI Architecture Overview: The iSCSI architecture is based on a client/server model. Typically, the client is a host system such as a file server that issues a read or write command. The server may be a disk array that responds to the client request. The following introduces some of the basic terms used in an iSCSI data transfer:

"Exchange"—The operations needed for an iSCSI data read or write operation. An exchange consists of three operational phases: command phase, data movement phase and response phase.

"Initiator"—Typically the client is the initiator that initiates a read or write command.

"Target"—Typically a disk array is the target that accepts a read or write command and performs the requested operation.

"Read/Write"—Reads or writes are based on the initiator. In a typical iSCSI exchange, an initiator sends a "read" or "write" command to a target. For a read operation, the target sends the requested data to the initiator. For a write command, the target sends a "Ready to Transfer Protocol Data Unit ("PDU")" informing the initiator that the target is ready to accept the write data. The initiator then sends the write data to the target. Once the data is transferred, the exchange enters the response phase. The target then sends a response PDU to the initiator with the status of the operation. Once the initiator receives this response, the exchange is complete. The use of TCP guarantees the delivery of the PDUs.

Typically, logical units in the target process commands. Commands are sent by the host system in Command Descriptor Blocks ("CDB"). A CDB is sent to a specific logical unit, for example, the CDB may include a command to read a specific number of data blocks. The target's logical unit transfers the requested data block to the initiator, terminating with a status message indicating completion of the request. iSCSI encapsulates CDB transactions between initiators and targets over TCP/IP networks.

"RDMA" Overview: Remote direct memory access (RDMA), is a communications technique that allows data to be transmitted from the memory of one computer to the memory of another computer without passing through either device's central processing unit ("CPU"), and without calling to an operating system kernel. RDMA is a response to increasing demands for network speed. Data can be transferred faster when it does not have to pass through the CPU. The InfiniBand standard (incorporated herein by reference in its entirety) is an example of a form of RDMA. Applications of RDMA include clustering and storage and networking for data centers. iWARP is an RDMA protocol that can use TCP/IP as a transport.

Markers, Data Integrity Fields ("DIFs") and Digests: Embedded in a stream of iSCSI or RDMA data, there are three fields, which may need to be located for processing by a receiving node. These fields are referred to as: Markers, DIFs, and Digests. Each of these fields may or may not be present in a data stream regardless of the presence of the other fields. The location of each field in a data stream is unrelated, but can have an affect on locating other fields.

Markers: Markers are inserted into a data stream periodically at a predetermined interval, starting at a given TCP sequence number. Markers are a fixed length, and indicate the offset to the start of the next (iSCSI)/previous (RDMA) protocol data unit ("PDU"). iSCSI markers are 8 bytes long, while RDMA markers are 4 bytes long. Insertion of iSCSI markers into the data stream is performed (logically) after insertion of digests and/or DIFs. RDMA markers are inserted into a data stream (logically) after the insertion of DIFs, but prior to insertion of Digests.

DIFs: DIFs are 8-byte fields appended to each block of data stored on a mass storage device. A DIF contains a Reference Tag, Application Tag, and a CRC value. As a direct memory access (DMA) operation occurs, it is necessary to calculate the CRC for each DIF on each data block during a transfer. Depending on the application in a system, an incoming data stream may need to insert DIFs periodically into the data stream, validate and remove them from the data stream, or validate them and keep them in the data stream. These are three different modes for processing DIFs. Calculation of the DIF CRC does not include Markers or Digests.

Digests: Digests are 4-byte fields appended to the end of a PDU, which are a CRC calculation over the data portion of the PDU. DIFs are included in the Digest calculation for both iSCSI and RDMA. Markers are not included in the iSCSI Digest calculation, but are included in the RDMA Digest calculation.

Figure 1E:
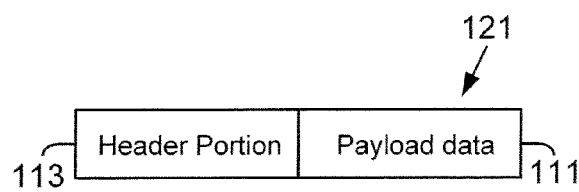
FIG. 1E shows an example of an information packet according to one embodiment.

FIG. 1E shows an example information packet 121 for use in a networked system with a network interface unit (NIU) of the present invention. The information packet 121 may be based upon a layered information transfer protocol. For example, the information packet 121 may be arranged in one or more predetermined layered protocol format. The information packet may include a payload data portion 111 and header portion 113. In one embodiment, for example, the information packet 121 may be arranged in a TCP/IP protocol format. In another embodiment, the payload data portion may contain data arranged based upon iSCSI or RDMA protocol format.

Figure 2:
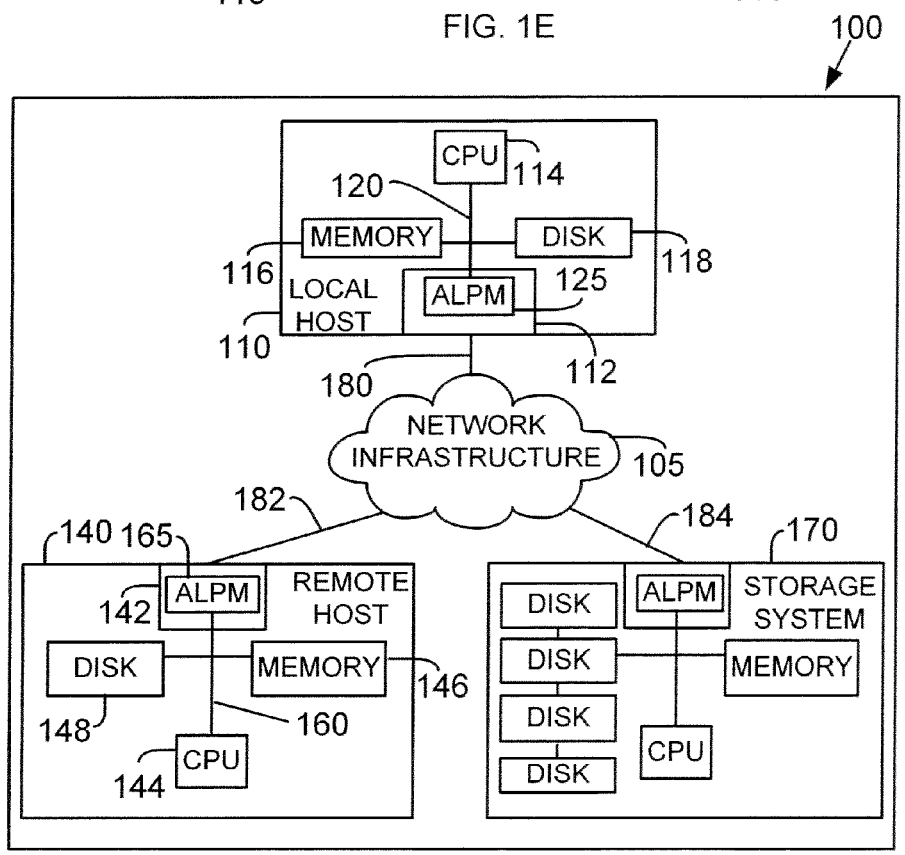
FIG. 2 shows a block diagram of a networked system with a network interface unit, according to one embodiment.

FIG. 2 shows an example of a networked system 100 in which endpoint systems may employ layered networking protocols to exchange information over network infrastructure (hereinafter, network 105). Each endpoint system, such as host computer 110, remote host 140, and storage system 170, may be coupled to network 105 by respective network links 180, 182, and 184. Network 105 may be a heterogeneous network, such as the Internet. Network links 180, 182, and 184 may be configured to provide high-bandwidth communication, but may use different physical media including, without limitation, copper wire media or optical fiber media. In addition, link 184 may be a wireless link through free space.

Host computers 110, 140 can be representative of modern computing systems capable of high-bandwidth communications over network 105, in general. One or both of host computers 110, 140 may be, without limitation, a personal computing system, a workstation, a server, or a computing cluster. In general, storage system 170 can be representative of high-performance storage systems, such as an interconnected clusters of storage area networks, having petabyte storage capacity, as may be suitable for a global-scale on-demand video archive. However, storage system 170 may also be a compact networked storage system having several commodity disk drives, suitable for personal or small office use.

Host computer 110 (or 140) may be coupled to network link 180 (or link 182 for host computer 140) by a respective network interface unit (NIU) 112 (142 for host computer 140). Desirably, network link 180 (or 182) is a high-bandwidth network link, and NIU 112 (or 142) is a high-performance network interface capable of exchanging high-bandwidth data signals with network link 180 (or 182) by employing a corresponding high-performance layered networking protocol.

Each computer (110, 140) also includes at least one host processor (CPU) (114, 144) host memory unit (116, 146) and a host storage unit (118, 148) which can be interconnected to exchange data with NIU 112, 142, by local interconnect subsystem (LIX) (120, 160). Host memory unit (116, 146) can be, for example, a local RAM memory cache. Host storage unit 118, 148 may be a disk drive in compliance with a selected SCSI-3 standard (hereinafter, SCSI disk). In general, data can be stored as SCSI data in a SCSI data storage format on SCSI disk (118, 148).

LIX 120, 160 can be configured as a physical point-to-point interconnect architecture, over which data can be conveyed in accordance with a predetermined interconnect protocol. Non-limiting examples of LIX 120 can include a PCIe shared data bus, an HTX™ switched fabric, a VME switched fabric, RapidIO, or proprietary CPU interconnects. LIX 120, 160 also may be virtual interface architecture.

To facilitate point-to-point transfer over LIX (120, 160) predetermined interconnect fields can be pre-pended, post-pended, and/or interposed to a respective data segment. The content and positioning of predetermined interconnect fields typically are prescribed by the predetermined interconnect protocol. Examples of a suitable predetermined interconnect protocol can be, without limitation, a PCIe interconnect protocol, HTX protocol, VME protocol, RapidIO protocol, etc.

In general, payload data 111 (FIG. 1E) is communicated within a computer 110, for example, between host storage unit 118 to NIU 112, over LIX 120 using a predetermined interconnect protocol corresponding to an architecture of LIX 120. For example, an interconnect protocol for communication for each application, like, transfer to and from a storage unit 118 may require the payload data 111 to be arranged in a certain format. This arrangement may include adding additional bits of information, like, for example, error detection code, source information and destination information. However, NIU 112 and NIU 142 often communicate the payload data 111, over network 105, as an information packet arranged in a pre-determined layered network protocol format using a predetermined layered network protocol.

A layered communication protocol may employ a hierarchical succession of logical protocol fields, represented by a logical protocol stack to identify source and destination of exchanged information within networked system 100. To facilitate point-to-point transfer, for example, over network link 180, predetermined protocol fields can be pre-pended, post-pended, or both, (collectively, "added") to a respective outbound data segment, for example, the payload data 111. Similarly, when an inbound payload data 111 is received as part of an information packet, predetermined protocol fields in the received inbound information packet are extracted to yield the payload data 111.

The content and position of a predetermined protocol field typically are prescribed by the predetermined layered protocol. For example, upper layer protocol fields representing one of Layers 5-7 as defined by the international standard called Open Systems Interconnection (OSI) may be used to identify logical termini corresponding to sender and receiver programs (or applications) in respective sender and receiver host computers. Intermediate layer protocol fields may facilitate information routing across networked system 100, using a selected transport mechanism. A protocol field corresponding to the lowest layer in the logical protocol stack, for example, Layer 2 (as defined by OSI), indicates the physical source of and destination for the information, and method of communication across adjacent network portions. In general, protocol fields are ordered such that the uppermost layer protocol field (for example, Layer 7) is most proximate to the outbound information, and that the lowest layer protocol (for example, Layer 2) field encapsulates the aggregation of outbound information and higher protocol fields.

A layered networking protocol may be a layered communication protocol representative of Layers 4 and below. An ordered data block configured to be communicated by a layered networking protocol typically includes predetermined networking protocol fields corresponding to Layers 4 and below. A layered storage protocol, leveraging advantages of a high-performance layered networking protocol, may correspond to Layer 5 and above, with an ordered data block also having predetermined storage protocol fields corresponding to the layered storage protocol.

Thus, to transfer payload data 111 from storage unit 148 to storage unit 118, the payload data 111 is arranged as an information packet 121 in a first predetermined layered network protocol format and NIU 142 sends the information packet 121 over link 182 to network 105. NIU 112 receives the information packet 121 over link 180 and transforms the information packet 121 into a first predetermined interconnect format, and transfers payload data 111 to storage unit 118 using a first predetermined interconnect protocol. Data transformation includes manipulating information packet 121 to extract payload data 111 from encapsulated predetermined networking protocol fields. If the information packet 121 is being communicated using a predetermined storage protocol, the information packet 121 also may need to be examined so that payload data 111 may be extracted from corresponding predetermined storage protocol fields. In addition, the constituent data elements of payload data 111 may need to be rearranged that corresponds to a first predetermined interconnect format, for transmission over LIX 120 to a data target, such as storage unit 118.

In accordance with the present disclosure, one or more of computer systems 110, 140 may include an adaptive layered protocol mediator (ALPM) 125, 165. In the example of computer 110 and information packet 121, ALPM 125 is configured with selectable receive ALPM filters (FIG. 3) that receive information packet 121 arranged in a first predetermined layered network protocol format, and transform information packet 121 into payload data 111 arranged in a first predetermined interconnect format.

Figure 3:
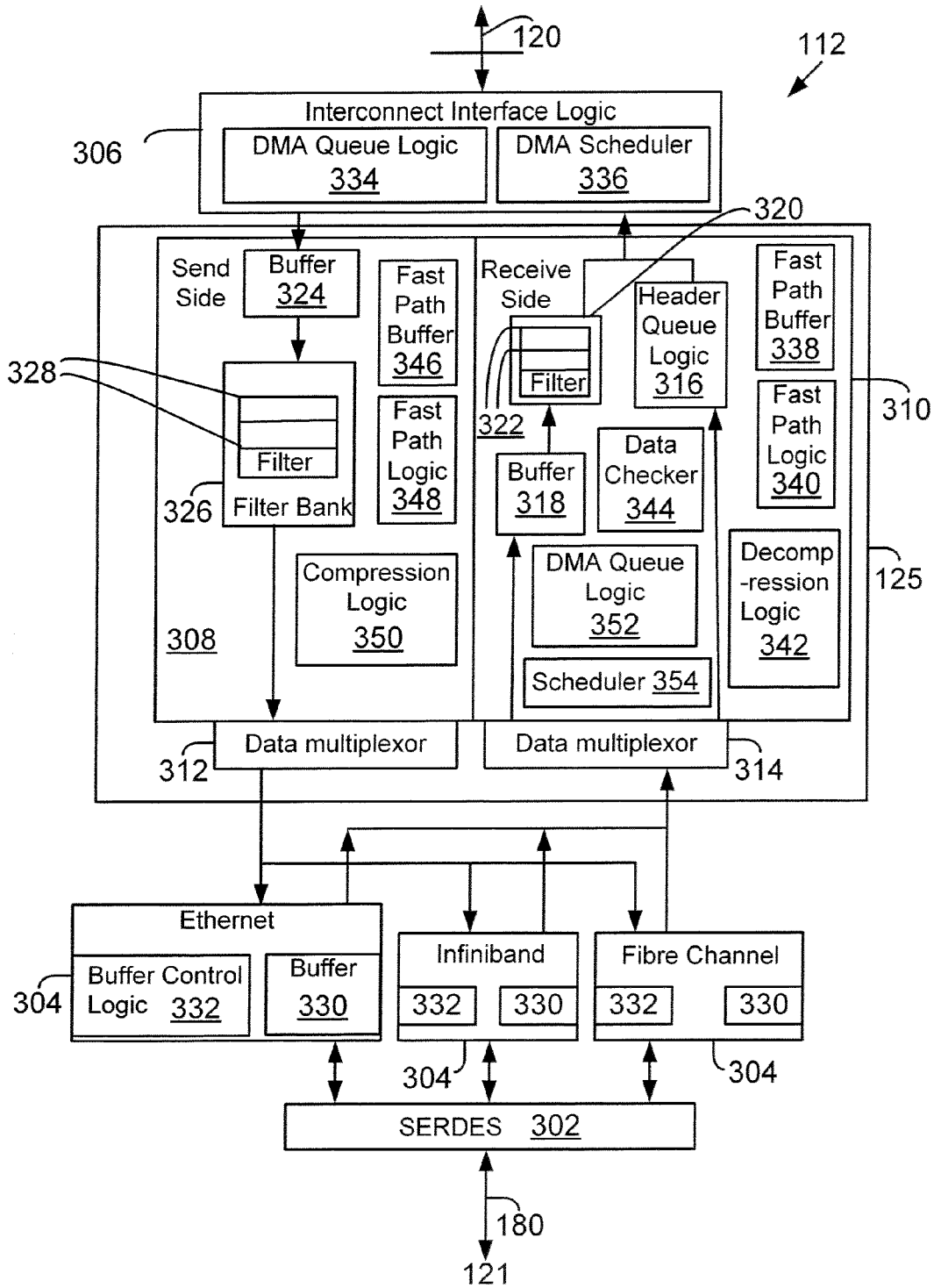
FIG. 3 is a block diagram of a network interface unit (NIU) with an Adaptive Layered Protocol Module, according to one embodiment.

FIG. 3 shows an example of NIU 112 of the present disclosure. NIU 112 may be based on a development board with a Field Programmable gate Array ("FPGA"). The chip may also be integrated into an Application Specific Integrated Circuit ("ASIC") with an embedded serialize/de-serializer ("SERDES") and internal programmable random access memory ("RAM").

NIU 112 includes a serial/deserializer (SERDES) 302, one or more protocol interface logic 304, ALPM 125, and interconnect interface logic 306. ALPM 125 includes a send (or transmit) side (segment) 308 and a receive side (segment) 310. The send side 308 of ALPM 125 is operatively connected to a send data multiplexer 312, which is operatively connected to protocol interface logic 304. The term "receive" as used in context with NIU 112 for processing network data means data received from the network via link 180. The term "send" or "sent" as used herein means data sent by NIU 112 via link 180.

The receive segment 310 of the ALPM 125 is operatively connected to a receive data multiplexer 314. The receive segment 310 of ALPM 125 also includes a Header Queue logic 316, a receive buffer 318 and receive ALPM Filter bank 320. The receive ALPM filter bank 320 includes one or more receive ALPM filters 322. The Header Queue logic 316 is operatively connected to the receive data multiplexer 314 to receive inbound data through protocol interface logic 304. Header Queue logic 316 is also operatively connected to interconnect interface logic 306. Receive buffer 318 is also operatively connected to receive data multiplexer 314 to receive inbound data through protocol interface logic 304. Receive buffer 318 is also operatively connected to receive ALPM Filter bank 320. The receive ALPM filter bank 320 is operatively connected to interconnect interface logic 306.

SERDES 302 coupled to protocol interface logic 304 modules, receives an information packet 121 via link 180. Protocol interface logic 304 receives protocol dependent information packet 121 and may perform manipulation or calculation on information packet 121 in anticipation that the information packet 121 may be in a specific layered network protocol format. For example, in one embodiment, the protocol interface logic 304 may calculate the checksum or cyclic redundancy check code for the information packer 121 and pass the calculated checksum or cyclic redundancy code information in association with the header for further use, as appropriate.

Interconnect interface logic 306 is operationally coupled to interconnect 120. Payload data 111 to be transmitted over link 180 is received by interconnect interface logic 306 as one or more direct memory access (DMA) queue request. In one embodiment interconnect interface logic 306 includes a send DMA queue logic 334 and a DMA scheduler 336. The DMA queue requests are stored in send DMA queue logic 334 and payload data 111 is sent to the send side 308 of ALPM 125, under control of DMA scheduler 336.

The send side 308 of the ALPM 125 also includes an output buffer 324 and a send ALPM filter bank 326. The send ALPM filter bank 326 includes one or more send ALPM filters 328. The interconnect interface logic 306 is operatively connected to the output buffer 324. The output buffer 324 is operatively connected to the send ALPM filter bank 326. The send ALPM filter bank 326 is operatively connected to send data multiplexer 312. The DMA queue requests stored in the DMA queue logic 334 are processed through the send ALPM filter bank 326, under the control of DMA scheduler 336 to assemble information packet 121. Information packet 121 is sent to the protocol interface logic 304 that sends the information packet 121 over link 180 via SERDES 302.

The send data multiplexer 312 of ALPM 125 is operatively connected to one or more protocol interface logic 304. In one embodiment, the protocol interface logic 304 may include a send information packet buffer 330 to hold the information packets 121 before the packet is sent over link 180. In another embodiment, the protocol interface logic 304 may include a buffer control logic 332 to monitor the send information packet buffer 330 and signal the interconnect interface logic 306 to control the flow of the information packets 121 into the send information packet buffer 330 to avoid overflow and under flow situations. Based upon the signal received from the buffer control logic 332, the interconnect interface logic 306 schedules processing of the payload data 111 through ALPM 125.

In one embodiment, the buffer control logic 332 may also monitor the state of remote buffers based upon flow control packets for protocols such as InfiniBand. In another embodiment, the DMA scheduler 336 receives a signal from buffer control logic 332. Based upon the received signal, DMA scheduler 336 of the interconnect interface logic 306 schedules processing of the payload data 111 that can be sent over link 180.

The send side 308 of the ALPM 125 may optionally have a send fast path buffer 346 and a send fast path logic 348. The send fast path buffer 346 and send fast path logic 348 may bypass processing of some payload data 111 through the send ALPM filter bank 326 and sends the information packet 121 directly to the protocol interface logic 304 to be sent over the interconnect 120. The send side 308 of ALPM 125 may optionally have a data compression logic 350, which compresses data to be sent on a packet-by-packet basis.

The receive side 310 of ALPM 125 may optionally have a receive fast path buffer 338 and a receive fast path logic 340. The receive fast path buffer 338 and receive fast path logic 340 may bypass processing of some information packets 121 by the receive ALPM filter bank 320 and sends portion of the information packet 121 to interconnect interface logic 306. The receive side 310 may optionally have a data decompression logic 342 and a data checker logic 344 that may decompress (or check) compressed data between data multiplexer 314, receive buffer 318 and Header Queue Logic 316, if the information packet 121 includes compressed data.

The receive operation of the NIU with ALPM will be described with reference to FIGS. 3 and 6. The send operation of the NIU with ALPM is also described below with reference to FIGS. 3 and 7.

Figure 6:
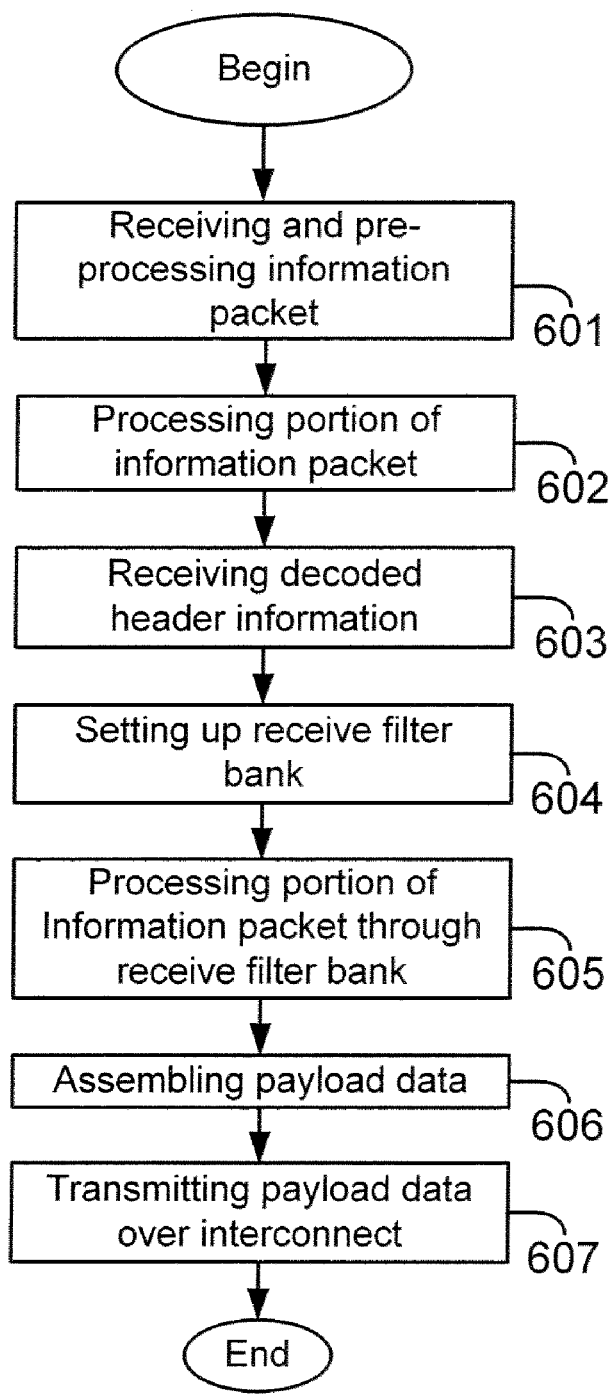
FIG. 6 shows a process flow diagram for processing an information packet received over a network link, according to one embodiment.

Receive Operation:

Referring to FIG. 6, in step 601, information packet 121 is received and pre-processed. Referring to FIG. 3, SERDES 302 receives information packet 121 arranged in a predetermined layered network protocol format via link 180. For example, the information packet may be arranged as a TCP/IP packet. SERDES 302 de-serializes the information packet 121 and passes the information packet 121 to protocol interface logic 304. In one embodiment, the protocol interface logic 304 determines the error detection code or the error correction code for information packet 121. In one embodiment, this determination is performed without determining whether the information packet 121 was received with an error detection or error correction code. The information packet 121 is then sent to receive data multiplexer 314. The receive data multiplexer 314 sends the information packet 121 to ALPM 125.

In step 602, a portion of information packet 121 is processed. A portion of information packet 121 is sent from data multiplexer 314 to Header Queue Logic 316 and also sent to receive buffer 318. In one embodiment, the portion of the information packet 121 that is sent to the Header Queue Logic 316 includes fields that may contain any information that is useful to parse payload data 111. In one embodiment, the portion of the information packet 121 sent to the receive buffer 318 includes one or more fields of the payload data 111. For example, if the information packet 121 is a TCP/IP packet, the fields of the TCP/IP packet including the data field may be sent to the Header Queue Logic 316. Similarly, the data portion of the TCP/IP packet may be sent to the receive buffer 318.

The portion of the information packet 121 that is received by Header Queue Logic 316 is processed to decode the information arranged in a predetermined layered protocol information format. For example, decoding includes determining information related to a data portion of the TCP/IP packet. In one embodiment, Header Queue Logic 316 processes the portion of the information packet 121. In another embodiment, the portion of the information packet 121 received by Header Queue Logic 316 may be passed on to interconnect interface logic 306 that processes the portion of the information packet 121. For example, embedded processors or dedicated state machines in interconnect interface logic 306 may perform the processing. In another embodiment, the portion of the information packet received by the interconnect interface logic 306 may be passed on to processor 114 via interconnect 120. In one embodiment, processor 114 processes the portion of information packet 121 and the processed results are returned to the interconnect interface logic 306 over the interconnect 120.

In step 603, the decoded information based upon the decoding of the portion of the information packet 121 is received as one or more DMA requests. DMA requests may be stored in a receive DMA Queue Logic 352. Receive scheduler 354 may process the stored DMA queues in receive DMA Queue Logic 352.

In step 604, receive ALPM filter hank 320 is set up based on the decoding of the portion of the information packet 121 received by Header Queue Logic 316. ALPM filter bank 320 is set up to process information packet 121.

In step 605, a portion of the information packet 121 is processed by the receive ALPM filter bank 320. The processing of information packet 121 stored in receive buffer 318 is performed by the receive ALPM filter bank 320 using one or more receive ALPM filters 322. The processing of the information packet 111 by the receive ALPM filter bank 320 will be described below in greater detail, while describing the operation of the receive ALPM filters 322 with respect to FIG. 4A.

In step 606, payload data 111 is assembled. After the processing of the portion of the information packet 111 by receive ALPM filter bank 320, the portion of the information packet 111 may emerge out of the receive ALPM filter bank 320 with no change, with some modifications or with rearrangement. In one embodiment, the portion of the information packet 121 from the receive ALPM filter bank 320 may be arranged to reflect payload data 111 with embedded headers checked and removed based on the portion of the information packet 121 stored in the receive buffer 318. In one embodiment, the portion of the information packet 121 emerging out of the receive ALPM filter bank 320 may have to be combined with additional information to derive the payload data 111. After the receive ALPM filter bank 320 processes the portion of the information packet 121, the processed information is transferred to interface interconnect logic 306.

In step 607, payload data 111 is transmitted over interconnect 120. The interconnect interface logic 306 routes payload data 111 to the destination, and terminates the DMA operation and the process ends.

Figure 7:
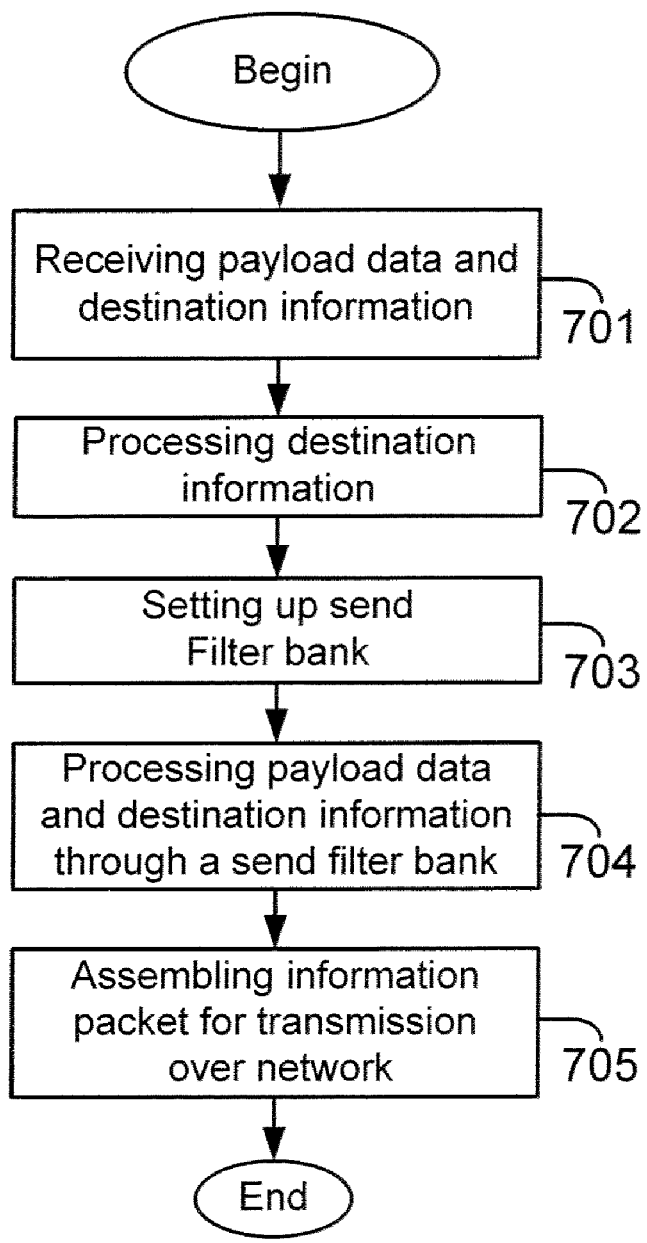
FIG. 7 shows a process flow diagram for processing payload data received over an interconnect, according to one embodiment.

Send Operation:

FIG. 7 shows a process flow diagram for sending network information via NIU 112, according to one embodiment. In step 701, during a send operation, interconnect interface logic 306 receives payload data 111 in a predetermined interconnect interface format with information related to a destination. The destination information may include, header information with or embedded in a DMA queue request. The interconnect interface logic 306 stores the DMA queue requests in send DMA Queue logic 334.

In step 702, interconnect interface logic 306 processes the DMA queue request stored in send DMA Queue logic 334.

In step 703, send ALPM filter bank 326 is set up based on the processing of the DMA queue request stored in the send DMA queue logic 334. ALPM filter bank 326 is set up so that outgoing payload data 111 can be transmitted efficiently.

In step 704, the adapter processes the payload data and the destination information through the send filter bank. The interconnect interface logic 306 loads the send buffer 324 of ALPM 125 with payload data 111 and other information related to the destination (for example, destination headers and other information) of the payload data 111. Scheduler 336 of interconnect interface logic 306 schedules processing of the interconnect information packet by send ALPM filters 328 of the send ALPM filter bank 326. In one embodiment, scheduler 336 awaits for a signal from buffer control logic 332 to schedule processing of the payload data 111 through the send ALPM filter bank 326. The coordinated processing of payload data 111 through the ALPM filter bank 326 may avoid congestion in protocol interface logic 302 for efficient transmission of the information packets for certain flow controlled protocols (for example, Fibre Channel and InfiniBand).

Payload data 111 is processed through send ALPM filters 328 to create the information packet 121 assembled in the predetermined layered protocol format. In one embodiment, information packet 121 may be sent into a store and forward buffer for speed matching and insertion of CRC's and checksums that may have been delayed in the filter stack (for example, the TCP checksum). In an embodiment, as the store and forward buffer is being filled, portion of the information packet 121 may also be sent (optionally) to a compression unit to reduce the size of the information packet 121 sent over link 180.

In step 705, the information packet 121 is received for assembly by protocol interface logic 304. The information packet 121 may be stored in send information packet buffer 332. The information packet 121 is assembled for transmission over network link 180. Based on the type of payload data 111 that is to be transmitted and the destination for the payload data 111, the payload data 111 is pre-pended, post-pended and/or modified to create an information packet 121. The information packet 121 is arranged in a predetermined layered protocol format, based upon a predetermined layered protocol. In one embodiment, this may include packetization wherein the payload data 111 received in the DMA Queue may be sent as one or more information packet 121, with relevant header fields being updated for subsequent packets. The protocol interface logic 304 then sends the information packet 121 to its destination over the link 180.

Receive ALPM Filters:

In one embodiment, receive ALPM Filters 322 includes state machines that receive one or more bytes of network data via link 180 and process data based on a control signal received from a control unit within receive ALPM filter 322. The receive ALPM filters 322 may process the received data either by removing one or more bits of data, adding one or more bits of data, perform mathematical operation on the received data to derive a result, for example, generating a check sum for checking data correctness and/or removal of data from the flow such as a DIF field, Marker or embedded header 410. In some circumstances, the receive ALPM filters 322 may just pass the data through, without any manipulation (for example, an input ALPM filter set up for DIF manipulation, where the current flow is for data that does not require DIF). The receive ALPM filters 322 may for example, receive and process data in four to eight byte segments. The number of bytes processed by a receive ALPM filter 322 may depend on the speed at which the data needs to be processed by NIU 112. For example, the receive ALPM filters 322 may be processing data as fast as LIX 120. By way of example, data width and core filter frequency determine data rate, i.e. 8 bytes with a core frequency of 500 Mhz provides a data flow of up to 4 GBytes/sec.

One or more receive ALPM filters 322 may be connected in series, wherein one or more bytes of data is first processed by one receive ALPM filter 322 and then passed to another receive ALPM filter 322. Further, one or more receive ALPM filters 322 may be stacked in parallel to process one set of one or more bytes of data by one receive ALPM filter 322 while another set of one or more bytes are processed simultaneously and independently by another receive ALPM filter 322.

Figure 4A:
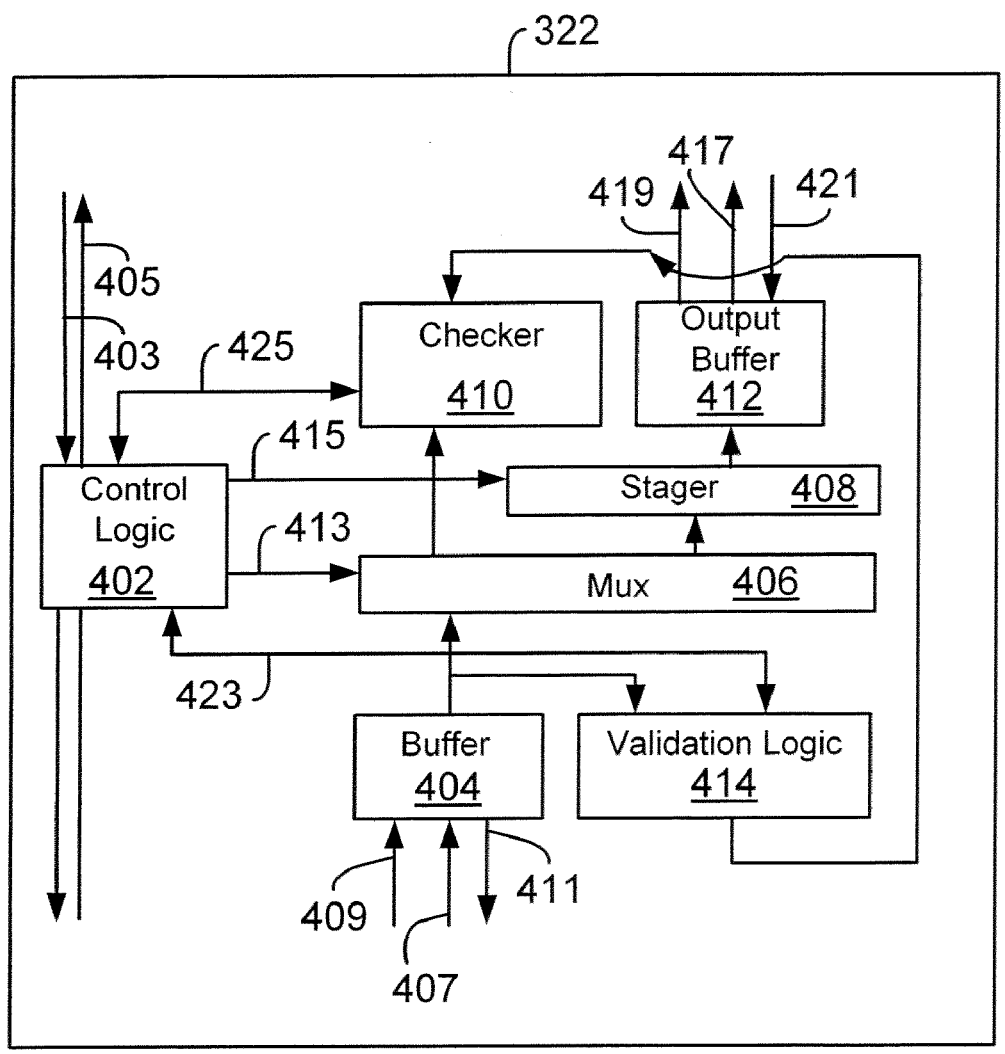
FIGS. 4A-4B show details of a receive filter and a send filter of the Adaptive Layered Protocol Module for use with the NIU of FIG. 3, according to one embodiment.

The receive ALPM filter 322 is further described below, with reference to FIG. 4A. The receive ALPM filter 322 includes a input filter control logic 402, receive input buffer 404, receive filter data multiplexer 406, receive data stager 408, field checker 410, and a receive output buffer 412. The receive ALPM filter 322 may optionally include validation code logic 414.

Receive input buffer 404 receives selective data (404A) from receive buffer 318 if it is a first receive ALPM filter 322 of receive ALPM filter bank 320; or from a receive output buffer 412 of another receive ALPM filter 322 that is connected in series with a current receive ALPM filter 322, if it is not the first receive ALPM filter 322. The data received by receive input buffer 404 may be one or more bytes of the information packet 121. In one embodiment, the data received by receive input buffer 404 may be one or more bytes of the payload data 111 received as part of the information packet 121. The output of the receive input buffer 404 is sent to receive filter data multiplexer 406.

Based on the decoding of the header portion of information in packet 121, which is arranged in a predetermined layered protocol format and received by Header Queue logic 316, the input control logic 402 determines if any data manipulation needs to be performed by the receive filter data multiplexer 406 and provides an appropriate control signal to the receive filter data multiplexer 406. In one embodiment, the input control logic 402 is given appropriate control signals over the input control bus 403 based on the processing of a DMA queue request by receive scheduler 354 stored in receive DMA Queue Logic 352. Input control logic 402 sends status over an input status bus 405. The receive input buffer 404 receives portion of the information packet 121 over the receive input data bus 407. The receive input buffer 404 also receives information related to the portion of the information packet 121 (for example, the size of the portion of the information packet 121) over receive input size bus 409.

The receive input buffer 404 then sends flow control related information over receive input flow control bus 411. The receive filter data multiplexer 406 is pre-configured to perform certain operation on the data received from the receive input buffer 404 upon receipt of an appropriate control signal 413 via the input control logic 402. For example, the receive filter data multiplexer 406 may be pre-configured to process the data either by removing one or more bits of data, adding one or more bits of data or rearranging the bits of data. In addition, upon receiving an appropriate control signal 407 from the input control logic 402, the receive filter data multiplexer 406 may also be instructed to pass the data received from the receive input buffer 404 without any manipulation.

After the data is processed by the receive filter data multiplexer 406, the data is sent to the receive data stager 408. Upon receipt of an appropriate control signal 415 from input control logic 402, the data in the receive data stager 408 is sent to receive output buffer 412. The output of the receive output buffer 412 may be sent to a next receive ALPM filter 322 in the receive ALPM filter bank 320 that is connected in series with a current receive ALPM filter 322. If the current receive ALPM filter 322 is the last receive ALPM filter 322 in the receive ALPM filter bank 320, the output of receive output buffer 412 is sent to interconnect interface logic 306.

The receive output buffer 412 sends portion of the information packet 121 over a receive output data bus 417. The receive output buffer 412 also sends information related to the portion of the information packet 121, (for example, the size of the portion of the information packet 121) over receive output size bus 419. The receive output buffer 412 sends flow control related information over receive output flow control bus 421. As one skilled in the art would appreciate, the receive output data bus 417, receive output size bus 419 and receive output flow control bus 421 of the receive ALPM Filter 322 may be operatively connected to receive input data bus 407, receive input size bus 409 and receive input flow control bus 411, respectively, of a next receive ALPM filter 322 connected in series with a current receive ALPM filter 322.

The input control logic 402 is also configured to communicate with validation code logic 414 and field checker logic 410. If data in receive input buffer 404 includes an error detection or correction code (for example, Cyclic Redundancy Code or checksum), then input control logic 402 may issue a control signal 423 to validation code logic 414 to generate a validation code. The validation code is compared with the error detection code or correction code included in the data. The error detection or correction code received as part of the data is selectively sent to field checker logic 410 via data multiplexer 406, upon receipt of appropriate control signal 425 from input control logic 402. The validation code generated by validation code logic 414 is also sent to field checker logic 410. The field checker logic 410 compares the error detection or correction code included in the data with the validation code generated by validation code logic 414 and provides the result to input control logic 402. If there was a mismatch between the error detection or correction code included in the data and the generated validation code, the input control logic 402 sends an appropriate signal to an exception handler (not shown) to deal with the error condition. If there was no mismatch, no further remedial action is taken.

As previously mentioned, one or more receive ALPM filters 322 may be connected in series, wherein one or more bytes of data processed by one receive ALPM filter 322 is sent to another receive ALPM filter 322 for processing. Further, one or more receive ALPM filters 322 may be stacked in parallel to process one set of one or more bytes of data by one receive ALPM filter 322 and another set of one or more bytes processed by another receive ALPM filter 322. For example, the output from the receiver output buffer 412 may be connected to a receiver input buffer 404 of another receive ALPM filter 322. The operation of this another receive ALPM filter 322 may be similar to the receive ALPM filter 322 described above. However, the receive filter data multiplexer 406 in this another receive ALPM filter 322 may be pre-configured to do a different manipulation operation on the data received from the receive input buffer 404 upon receipt of appropriate control signal from input control logic 402.

As one skilled in the art would appreciate, receive ALPM filter bank 320 may be configured to include multiple receive ALPM filters 322, with each receive ALPM filter 322 configured to perform a certain manipulation operation on the data received in receive input buffer 404 and upon receipt of appropriate control signal from the input control logic 402. By selectively enabling one or more receive ALPM filter to perform the manipulation, the information packet 121 may be appropriately manipulated to assemble the payload data 111.

Figure 4B:
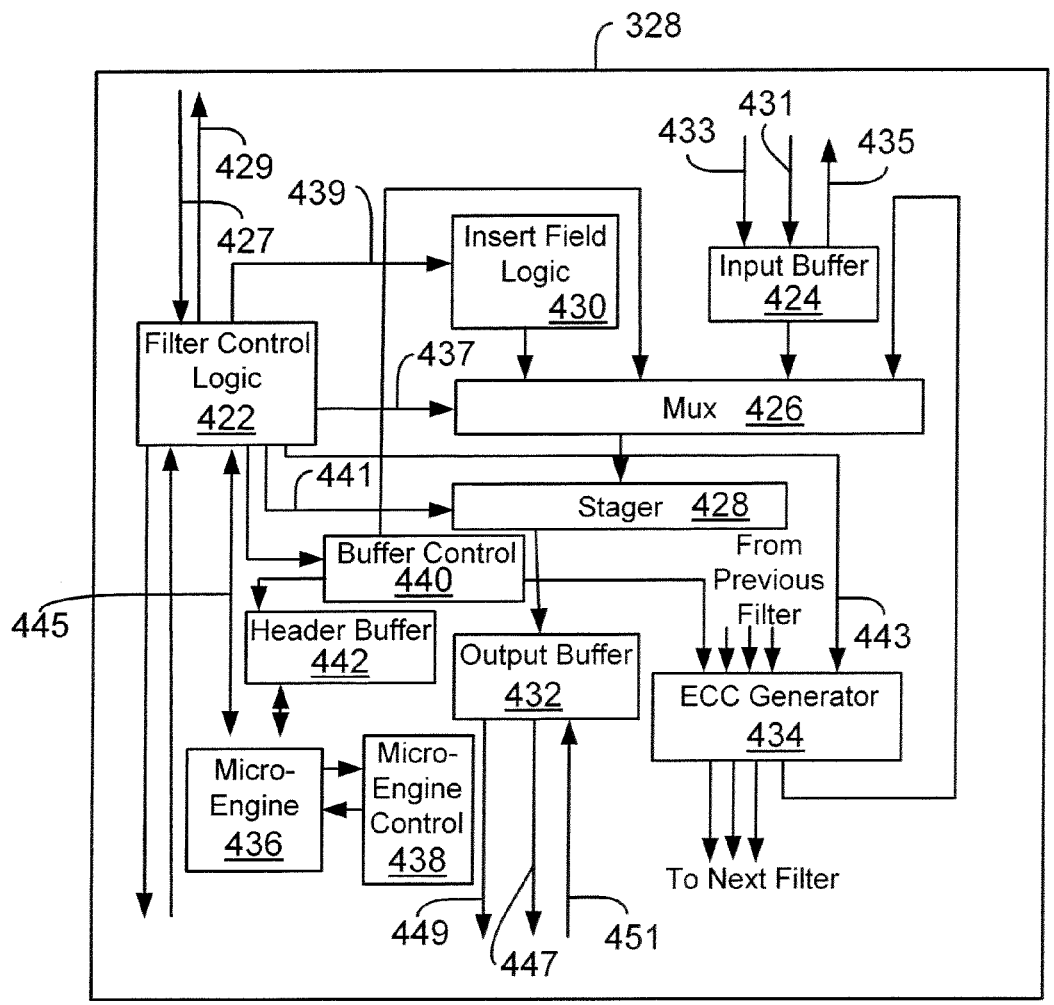

Send ALPM Filters:

FIG. 4B shows a block diagram for send ALPM filter 328. The send ALPM filter 328 includes a output filter control logic 422, send input buffer 424, send filter data multiplexer 426, send data stager 428, Insert field logic 430, and a send output buffer 432. The send ALPM filter may optionally include an error detection/correction code generator 434. The send ALPM filter may additionally include a micro-engine 436, a micro-engine control 438, a buffer control 440 and a saved header buffer 442 for packetization.

The send ALPM filters 328 may process data either by removing one or more bits of data, adding one or more bits of data, or perform mathematical operation on the data to derive a result, for example, generating a check sum on the data. The send ALPM filters 328 may also add additional bits of data, for example, header information, CRC or checksum information. In some situations the send ALPM filters 328 may pass data without any manipulation. The send ALPM filters 328 may for example, receive and process data in four to eight bytes. The number of bytes processed by a send ALPM filter 322 may depend on the speed at which payload data 111 is being received and needs to be processed through the adapter. For example, the send ALPM filters 322 may process data as fast or faster than interconnect interface 120.

In one embodiment, one or more send ALPM filters 328 may be connected in series, wherein one or more bytes of data processed through one send ALPM filter 322 is passed to another send ALPM filter 328 for processing. In another embodiment, one or more send ALPM filters 328 may be stacked in parallel to process one set of one or more bytes of data by one send ALPM filter 328, while another set of one or more bytes is processed by another send ALPM filter 328.

The send ALPM Filters 328 includes state machines that receive one or more bytes of payload data 111 and/or information related to a destination for payload data 111. The send ALPM filters 328 process data based on a control signal(s) received by output filter control logic 422 over the output control bus 427. The output filter control logic 422 sends status over output status bus 429.

The send input buffer 424 receives selective data from send (output) buffer 324 (FIG. 3) if it is the first send ALPM filter 328 of the send ALPM filter bank 326; or from a send output buffer 432 of another send ALPM filter 328 that is connected in series with a current send ALPM filter 328, if it is not the first send ALPM filter 328 of the send ALPM filter bank 326. The send input buffer 424 receives the selective data over the send input data bus 431. The send input buffer 424 also receives information related to the selective data (for example, the size of the selective data) via send input size bus 433. The send input buffer 424 sends the flow control information over send input flow control bus 435.

The data received by the send input buffer 424 may be one or more bytes of the payload data 111. In one embodiment, the data received by send input buffer 424 may include one or more bytes of destination information along with payload data 111. The destination information may be assembled along with payload data 111 to generate the information packet 121 to be sent over the link 180.

In one embodiment, the data received by send input buffer 424 may be one or more bytes of data that would be assembled as part of the application level data portion to be sent as part of the information packet 121.

The output of send input buffer 424 is sent to send filter data multiplexer 426. The output filter control logic 422 determines if any data manipulation needs to be performed by send filter data multiplexer 426 and provides an appropriate control signal 437 to send filter data multiplexer 426. The send filter data multiplexer 426 is pre-configured to perform a certain manipulation operation on the data received from the send input buffer 424. In addition, the send filter data multiplexer 426 may also be instructed to pass the data received from send input buffer 424 without any manipulation. For example, send filter data multiplexer 426 may be pre-configured to process data either by removing one or more bits of data, adding one or more bits of data or rearranging the bits of data.

Insert field logic 430 receives control signal 439 from output filter control logic 422 and depending upon control signal 439, generates one or more bits of data and send the data to send filter data multiplexer 426. After the data is processed by send filter data multiplexer 426, the data is sent to send data stager 428.

Upon receipt of appropriate control signal 441 from output filter control logic 422, data in the send data stager 428 may be selectively sent to error detection/correction code generator 434. Upon receipt of appropriate control signal 443 from output filter control logic 422, error detection/correction code generator 434 generates a code corresponding to the data it received and sends the generated code to send filter data multiplexer 426. In one embodiment, the code generated by error detection/correction code generator 434 receives code generated by a previous filter and combines the code generated by the previous filter with the code generated by a current filter based upon receipt of an appropriate control signal 443. In another embodiment, the code generated by the current filter is sent to the error detection/correction code generator of the next filter, for use in generating the code in the next filter.

In one embodiment, saved header buffer 442 stores header information that is pre-appended to payload data 111 for packetization. Upon receipt of appropriate control signal from output filter control logic 422, the header information is sent to send filter data multiplexer 426. The output filter control logic 422 again provides a control signal to send filter data multiplexer 422 and data from send filter data multiplexer 422 is sent to send data stager 428.

In one embodiment, for example, if there is header information for a destination with data portion that may have to be sent as multiple information packets 121, processing the data through the send ALPM filters may assemble additional information packets. In this case, the header information from saved header buffer 442 is updated by micro-engine 436 and saved in saved header buffer 442. The updated header information is sent to send filter data multiplexer 426 and based on an appropriate control signal 445 from output filter control logic 422, the header information is pre-pended to payload data 111. This process is repeated until all payload data 111 associated with a given data transfer is completed.

The one or more bytes of the data processed and manipulated by send ALPM filter is loaded into send output buffer 432. The assembled data from send output buffer 432 is sent over send output data bus 447. Selective information related to the manipulated data, for example, the size of the manipulated data is sent over send output size bus 449. The flow control information is sent over send output flow control bus 451.

As previously mentioned, one or more send ALPM filters 328 may be connected in series, wherein one or more bytes of data processed through a first send ALPM filter 328 is sent to another (second) send ALPM filter 328 for processing. Further, one or more send ALPM filters 328 may be stacked in parallel to process one set of one or more bytes of data by a first send ALPM filter 328 and another set of one or more bytes processed by a second send ALPM filter 328. Although the second send ALPM filter 328 may operate in a similar manner as the first ALPM filter 328, the send filter data multiplexer 426 in the second send ALPM filter 328 may be pre-configured to perform a different manipulation operation on the data received from send input buffer 424. In one embodiment, various combinations of send ALPM filters 328 with pre-configured send filter data multiplexers 426 are used for performing certain manipulation operations on the data received from send input buffer 424.

Example

Handling Markers, DIFs and Digests for Incoming PDUs

Figure 5A:
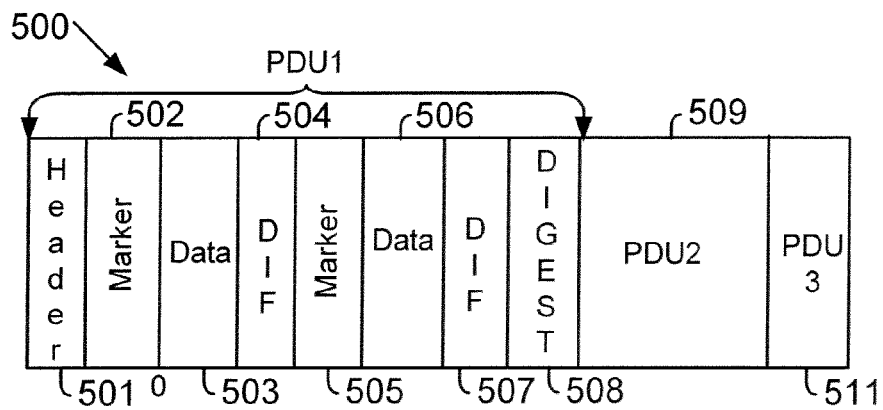
FIGS. 5A-5C show various block diagrams of a protocol data unit that are processed, according to one embodiment.

FIG. 5A shows PDUs 500, 509 and 511. The overall structure of the PDUs is the same and hence only PDU 500 is shown with all the components. It is noteworthy that the present invention is not limited to any particular number of PDUs and the three PDUs are shown to illustrate the overall data structure of the PDUs. Also, PDUs 500, 509 and 511 may not be received in any particular order.

PDU 500 includes a header 501, with a first marker 502. Thereafter, markers are placed evenly, for example, every 512 Bytes (shown as marker 505). Data itself is shown as 503 and 506. DIFs 504 and 507 follow data blocks 503 and 506, respectively. The last part of PDU 500 is digest 508. It is noteworthy that the boundaries between PDU 1 and 2 overlap, i.e., digest 508 may be received with a portion of PDU 2, shown as 509.

Figure 5B:
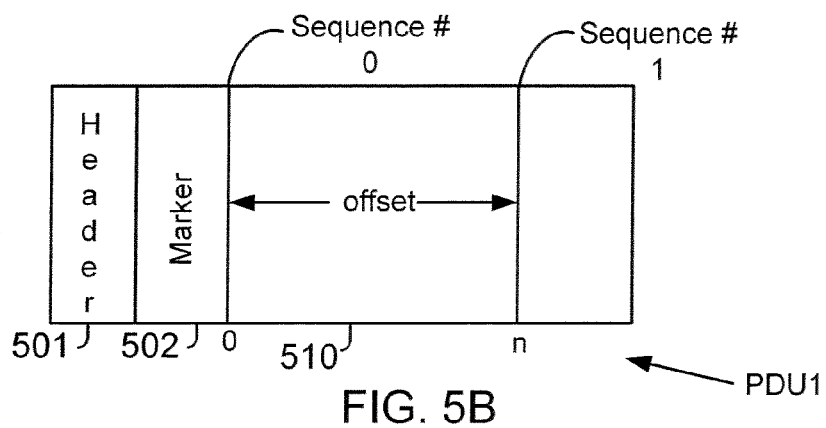

Marker Processing:

When system 140 is ready to communicate with system 110, the devices negotiate whether markers will be supported. Header 501 information is decoded to determine the location of a first marker in a given data stream. Normally, other markers occur at regular intervals, for example, every 512 Bytes. To locate markers in a data stream for a given DMA, one needs to know the offset of the first word in the DMA from the first marker (shown as 502) in a data stream (shown as PDU 1, PDU 2 and PDU 3 (511) in FIG. 5A). The offset is shown as 510 in FIG. 5B that shows a partial view of PDU 1, described above with respect to FIG. 5A.

As previously mentioned, header queue logic 316 (FIG. 3) processes header information, based on which the first marker location is determined. Thereafter, input control logic 402 receives an appropriate control signal to pass the data portion of an information packet 121 to process the markers. For example, based on the control signal received by input control logic 402, one or more receive ALPM filters may be appropriately selected to process markers.

Processing DIFs:

Once an initial location of the DIF field is determined for a DMA (i.e. data transfer), then DIFs may be handled in three different modes.

Insert (Append) mode: DIFs are inserted before data is sent to the wire from local memory;

Validate and Remove Mode: DIFs are validated and then removed before data is sent to host; and Validate and Keep Mode: DIFs are validated and kept before data is sent to the storage.

Figure 5C:
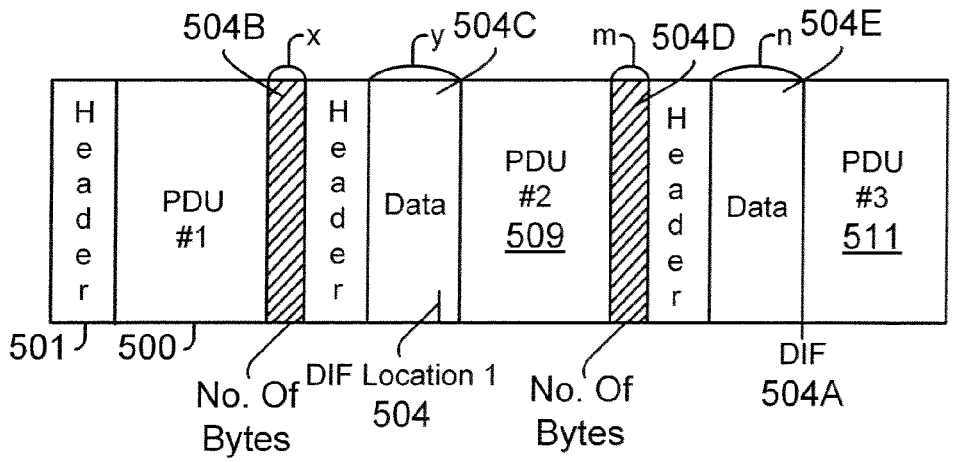

Before describing how DIFs are processed, it is noteworthy that DIF boundaries and PDU boundaries are not always perfectly aligned and may often overlap. FIG. 5C shows three PDUs (1, 2 and 3) adjacent to each other; however, the PDUs may not be received in order. Therefore, in one embodiment, the last number bytes that are transferred for a PDU with a partial CRC are stored so that a next PDU can be processed. For example, as shown in FIG. 5C, to process PDU 2 509, the last few bytes of PDU 1 (shown as "x", 504B) are stored with partial CRC. This is used for processing 504C, which also has DIF 504. The same is applicable for processing PDU 3 511, where block 504D (shown as "m") is stored to process 504E (shown as "n") with DIF 504A.

As previously mentioned, header queue logic 316 processes header information to determine DIF locations. Then the input control logic 402 receives an appropriate control signal to send the data portion of information packet 121 to process the DIFs. For example, based on the control signal received by input control logic 402, one or more receive ALPM filters may be appropriately selected to process DIFs in various modes as previously mentioned.

Processing Digests:

Digests are located in the last few bytes (for example, 4) of a PDU. Thus, for a given DMA, the current offset of the PDU, the length of the PDU, and the DMA length determine whether the last 4 bytes of the DMA are digests, i.e., if the DMA length+PDU offset is equal to the PDU Length, and then the last 4 bytes of the DMA are digests.

As previously mentioned, header queue logic 316 processes header information, based on which digest location is determined. The input control logic 402 then receives an appropriate control signal to pass the data portion of information packet 121 to process the Digests. For example, based on the control signal received by input control logic 402, one or more receive ALPM filters may be appropriately selected to process Digests.

Outbound Packet Processing:

Inserting Markers:

As previously mentioned, interconnect interface logic 306 receives payload data 111 in a predetermined interconnect interface format and information related to a destination of the payload data 111 to be transmitted. Markers are inserted in a data stream periodically at a predetermined interval, starting at a given TCP sequence number. Interconnect interface logic 306 processes a DMA queue requests and sets up the send ALPM filter bank 326 by sending an appropriate control signal to the send ALPM filter bank 328. Based on the control signal, appropriate send ALPM filters are enabled to process the input data and add markers at the designated location(s).

Inserting DIFs:

DIFs are 8-byte fields appended to each block of data stored on a mass storage device. A DIF includes a Reference Tag, Application Tag, and a CRC value. Interconnect interface logic 306 processes a DMA queue request and sets up the send ALPM filter bank 326 by sending an appropriate control signal. Based on the control signal, appropriate send ALPM filters 328 are enabled to process input data, determine the CRC and add the DIF field into the data stream.

Digests:

Digests are 4-byte fields appended to the end of a PDU. Digests include a CRC that is determined over a data portion of the PDU. Interconnect interface logic 306 processes the DMA queue requests and sets up the send ALPM filter bank 326 by sending an appropriate control signal to the send ALPM filter bank. Based on the control signal received, appropriate send ALPM filters are enabled to process input data, calculate the CRC over a data portion of the PDU and add the Digest field in the data stream.

Although the present invention has been described with reference to specific embodiments, these embodiments are illustrative only and not limiting. Many other applications and embodiments of the present invention will be apparent in light of this disclosure and the following claims.

What is claimed is:

1. An adapter for processing an information packet of a layered information transfer protocol received over a link, the information packet arranged in one or more predetermined layered protocol format and including a header portion and a payload data, the adapter comprising:
a receive filter bank configured to process a portion of the information packet and assemble the payload data in a predetermined interconnect format from among a plurality of interconnect formats;
wherein the receive filter bank includes a plurality of receive filter logic, where each receive filter logic includes an input filter control logic that (i) uses a decoded header portion of the information packet to generate a first control signal for manipulating the information packet by performing one or more of (a) inserting a bit, (b) removing a bit, and (c) rearranging bits in the information packet; (ii) generates a second control signal that is sent to a validation logic for generating a validation code for verifying error detecting code included in the information packet; and (iii) generates a third control signal for transferring post processed information from a storage location of the receive filter logic to a next location;
wherein information packet processing is split among the plurality of receive filter logic such that an output from one receive filter logic is input to another receive filter logic until the processing is complete.

2. The adapter of claim 1, wherein the adapter is configured to decode the header portion of the information packet before the receive filter bank is set up to process the portion of the information packet.

3. The adapter of claim 1, wherein the adapter is operatively connected to a memory device and a central processing unit, the memory device operatively connected to the central processing unit; and the payload data is transferred from the adapter to the memory device, without the intervention of the central processing unit.

4. The adapter of claim 2, wherein each of the plurality of receive filter logic is configured to receive selective portion of the information packet and process the selective portion of the information packet based on the set up of each of the receive filter logic.

5. The adapter of claim 4, wherein each of the receive filter logic process and manipulate the selective portion of the information packet based upon the decoded header portion of the information packet.

6. The adapter of claim 5, wherein at least one of the input filter control logic selectively enables the corresponding receive filter logic to pass the selective portion of the information packet without manipulation, based upon the decoded header portion of the information packet.

7. The adapter of claim 4, wherein a subset of the plurality of receive filter logic are operatively connected in series such that the information packet is processed serially by the plurality of receive filter logic.

8. The adapter of claim 4, wherein a subset of the plurality of receive filter logic are operatively stacked in parallel for processing portions of the information packet in parallel.

9. The adapter of claim 4 further includes a protocol interface logic to receive the information packet and present the information packet to the receive filter bank.

10. The adapter of claim 4 further including an interconnect interface logic to present the payload data to its destination over an interconnect.

11. The adapter of claim 1 wherein the layered information transfer protocol is based on one or more of Ethernet protocol, Infiniband protocol, and Fibre channel protocol.

12. The adapter of claim 10 wherein the payload data is presented to its destination over an interconnect based on one or more of PCIe interconnect protocol, HTX protocol, VME protocol and RapidIO protocol.

13. An adapter for processing a payload data and destination information for the payload data received over an interconnect, the payload data arranged in one or more predetermined interconnect format, the adapter comprising:
a send filter bank configured to process a portion of the payload data and assemble the payload data with the destination information in a predetermined layered protocol format from among a plurality of protocol formats;
wherein the destination information is included with or embedded in a direct memory access (DMA) request for transferring the payload data through the adapter;
wherein the send filter bank includes a plurality of send filter logic, where each send filter logic includes:
an output filter control logic that (i) generates a first control signal for manipulating the payload data and the destination information by performing one or more of (a) inserting a bit, (b) removing a bit, and (c) rearranging bits; (ii) generates a second control signal for generating a code that is sent with the payload and the destination information; and (iii) generates a third control signal for appending header information stored at a storage location to the payload data;
an insert field logic that generates information that is inserted or sent with the payload based on the first control signal; and
an error detection and correction code generator that generates the code in response to the second control signal;
wherein when the payload for a data transfer is split into multiple packets then the header information stored at the storage location is updated before being sent with the multiple packets.

14. The adapter of claim 13, wherein each of the plurality of send filter logic is configured to receive selective portion of the payload data and process the selective portion of the payload data based on a set up of each of the send filter logic.

15. The adapter of claim 14, further including an interconnect interface logic to receive the payload data and the destination information for the payload data; and process the destination information for the payload data.

16. The adapter of claim 14, wherein at least one of the output filter control logic selectively enables a corresponding send filter logic to pass a selective portion of the payload data without manipulation, based upon the processed destination information for the payload data.

17. The adapter of claim 14, wherein a subset of send filter logic are operatively connected in series and a subset of send filter logic are operatively stacked in parallel.

18. The adapter of claim 13, wherein the predetermined interconnect format is based on one or more of PCIe interconect protocol, HTX protocol, VME protocol and RapidIO protocol.

19. The adapter of claim 13, wherein the predetermined layered protocol format is based on one or more of Ethernet protocol, Infiniband protocol and Fibre channel protocol.

20. A method of processing an information packet of a layered information transfer protocol received over a link, the information packet arranged in one or more predetermined layered protocol format and including a header portion and a payload data, the method comprising:
processing a portion of the information packet through a receive filter bank, wherein the receive filter bank includes a plurality of receive filter logic, each receive filter logic includes an input filter control logic that (i) uses a decoded header portion of the information packet to generate a first control signal for manipulating the information packet by performing one or more of (a) inserting a bit, (b) removing a bit, and (c) rearranging bits in the information packet based; (ii) generates a second control signal that is sent to a validation logic for generating a validation code for verifying error detecting code included in the information packet; and (iii) generates a third control signal for transferring post processed information from a storage location of the receive filter logic to a next location;
setting up the plurality of receive filter logic based on the decoded header portion, wherein each of the input filter control logic sets up the corresponding receive filter logic; and
assembling the payload data in a predetermined interconnect format from among a plurality of interconnect formats; wherein information packet processing is split among the plurality of receive filter logic such that an output from one receive filter logic is input to another receive filter logic until the processing is complete.

21. The method of claim 20, wherein each of the plurality of receive filter logic is configured to receive selective portion of the information packet and process the selective portion of the information packet based on the set up of each of the receive filter logic.

22. The method of claim 21, further including selectively enabling at least one of the receive filter logic to pass the selective portion of the information packet without manipulation, based upon the decoded header portion of the information packet.

* * * * *

UNITED STATES PATENT AND TRADEMARK OFFICE
CERTIFICATE OF CORRECTION

| | |
|---|---|
| PATENT NO. | : 8,411,677 B1 |
| APPLICATION NO. | : 11/842830 |
| DATED | : April 2, 2013 |
| INVENTOR(S) | : Ian Gregory Colloff |

Page 1 of 1

It is certified that error appears in the above-identified patent and that said Letters Patent is hereby corrected as shown below:

In the Specification

In column 3, line 25, delete "embodiment:" and insert -- embodiment; --, therefor.

Signed and Sealed this
Third Day of September, 2013

Teresa Stanek Rea
*Acting Director of the United States Patent and Trademark Office*